United States Patent [19]

Matsushita et al.

[11] 4,265,513
[45] May 5, 1981

[54] LIGHT SWITCH

[75] Inventors: Shigeo Matsushita; Ro Ishikawa; Kazuhisa Kaede; Ikuo Mito; Shigetoki Sugimoto, all of Tokyo, Japan

[73] Assignee: Nippon Electric Co., Ltd., Tokyo, Japan

[21] Appl. No.: 67,013

[22] Filed: Aug. 16, 1979

[30] Foreign Application Priority Data

| Aug. 17, 1978 | [JP] | Japan | 53-113005[U] |
| Aug. 30, 1978 | [JP] | Japan | 53-106551 |
| Aug. 30, 1978 | [JP] | Japan | 53-119340[U] |
| Sep. 14, 1978 | [JP] | Japan | 53-127348[U] |
| Sep. 14, 1978 | [JP] | Japan | 53-127349[U] |
| Sep. 18, 1978 | [JP] | Japan | 53-128537[U] |

[51] Int. Cl.³ .................................. G02B 5/14
[52] U.S. Cl. .................. 350/96.20; 350/96.16; 350/96.18
[58] Field of Search ............... 350/96.16, 96.18, 96.20

[56] References Cited

U.S. PATENT DOCUMENTS

| 4,111,524 | 9/1978 | Tomlinson ............... 350/96.16 |
| 4,208,094 | 6/1980 | Tomlinson et al. ......... 350/96.16 |

OTHER PUBLICATIONS

K. Kobayashi et al., "Micro-Optics Devices for Branching, Coupling, Multiplexing & Demultiplexing", *International Conf. on Integrated Optics* . . . , Jul. 1977, Tokyo, Japan.
K. Suzuki et al., "Optical Fiber Line Switch", *Proceedings National Convention of IE & CE of Japan*, vol. 4, pp. 4–113, Mar. 1978.
Mito et al., "Motor-driven Rotary Mirror Type Multichannel Line Switch" in Proceedings National Conv. of E & C.E. of Japan, vol. 4, pp. 4–117, Mar. 1978.
Tomlinson et al., "Multiposition Optical Fibre Switch" in Electronics Letts., vol. 15, No. 6., Mar. 1979.
M. Nunoshita et al., "Optical Switch for Multimode Optical-Fiber Systems" in *Optics Letts.*, vol. 4, No. 1, Jan. 1979.
A. Ishikawa et al., "Beam Splitting & Coupling Circuits Using a Selfoc Lens" at *Meeting Institute of Japan Electronic Comm. Eng.*, Mar. 1977.

*Primary Examiner*—Stewart J. Levy
*Attorney, Agent, or Firm*—Hopgood, Calimafde, Kalil, Blaustein & Lieberman

[57] ABSTRACT

A multichannel light switch including a cylindrical-shaped light-focusing transmission body having a length equal to an odd multiple of one quarter of the pitch of light beam undulation within the body and having a total reflection coating applied to one end face thereof, which is normal to the axis of the transmission body. A stationary optical fiber bundle is arranged opposite to the other end face of the transmission body and is in parallel to the axis thereof. For light-path switching between the optical fibers, the transmission body is adapted to be displaced in a radial direction or to be rotated in a plane normal to the axis thereof.

9 Claims, 20 Drawing Figures

LIGHT SWITCH

BACKGROUND OF THE INVENTION

This invention relates to light switches for use in optical fiber communication systems and more particularly to those of the type capable of light-path switching between a multitude of optical fibers.

Recent improvements in the quality and performance of semiconductor devices, optical fibers and other devices for communication use are remarkable and light transmission systems employing such devices are being vigorously developed in many places.

One of the devices essential for practical application of such light transmission systems is a light switch usable between a light transmitter or receiver and a multitude of light transmission lines for switching therebetween or, that is useable, between a light transmission line and a plurality of light transmitters or receivers for switching therebetween. It is required that such a device be above all, compact in size, low in insertion loss, inexpensive and highly reliable.

Previously proposed are a number of forms of multichannel light switches which are usable to direct a light beam as desired through a single optical fiber into any one of a number of other optical fibers. In one form of such a light switch, four optical fibers are arranged in a rectangular case, one fiber along each of its four parallel edges and another optical fiber, clad with magnetic material, is arranged in opposing relation to the set of four optical fibers in a manner such that it may be displaced under the attraction of an exterior magnet so as to be switched over from one to another of the four fibers. (See the article, "Optical Fiber Line Switch (II)", Katsuhiro Suzuki et al, in the Proceedings of the 1978 National Convention of the Institute of Electronics and Communications Engineers of Japan, Vol. 4, p. 4-113, March 1978).

This form of light switch, however, is disadvantageous in that it is liable to fail or break owing to the movements required of the optical fiber for switching operations and time-consuming adjusting work is required to set each of the optical fibers precisely in place.

In another form of multichannel light switch previously proposed, a plurality of optical fibers each with a light-focusing transmission body attached thereto are radially arranged on a plane.

Another optical fiber, again with a light-focusing transmission body attached thereto, is arranged on an axis extending through the center of the plane at right angles thereto. For switching the light path between the central optical fiber and the radially arranged ones, a plane mirror is disposed in the central region at an angle of inclination of 45° to the plane and is rotatable about the axis referred to above. (See the article, "Motor-driven Rotary Mirror Type Multichannel Light Switch", Ikuo Mito et al, in the Proceedings of the 1978 National Convention of Electronics and Communications Engineers of Japan, Vol. 4, p. 4-117, March 1978.) This form has disadvantages because it involves alignment difficulties in optimum-positioning optical fibers, and it is costly, because of the number of light-focusing transmission bodies employed.

SUMMARY OF THE INVENTION

Under these circumstances, the object of the present invention is the provision of a novel form of multichannel light switch which can be assembled and adjusted with ease and which is inexpensive.

According to the present invention, a light switch is provided which comprises a cylindrically-shaped light focusing transmission body or a so-called rod lens having opposite end faces normal to the axis thereof and having a refractive index radially graded to decrease in proportion to the square of the distance from the axis. The axial length of the body is equal to an odd multiple of one quarter of the pitch of off axis light beam undulation in the transmission body. Reflecting means are provided on one of the end faces of the transmission body. A bundle of optical fibers is arranged closely adjacent to the other end face of the transmission body parallel to the axis of the latter. Means for moving the transmission body relative to the bundle of optical fibers in a plane normal to the axis of the transmission body are also provided.

The above and other objects, features and advantages of the present invention will become apparent from the detailed description when taken in conjunction with the accompanying drawings, which illustrate several preferred embodiments of the invention.

BRIEF DESCRIPTION OF THE DRAWINGS

In the drawings:

FIG. 1b is a transverse cross section of same, taken along the line A-A' in FIG. 1a;

FIG. 4b is an enlarged oblique view of the bundle of optical fibers used in the embodiment of FIG. 4a;

FIG. 5b is an oblique view to explain the process of fabricating the optical fiber bundle shown in FIG. 5a;

FIG. 5c is an oblique view of a protecting cover structure as applied to the optical fiber bundle shown in FIG. 5a;

DESCRIPTION OF THE PREFERRED EMBODIMENTS

Before explaining the details of the preferred embodiments of the present invention, a brief description will now be made of the light-focusing transmission body or so-called rod lens, usable in the present invention, which is a cylindrical-shaped transparent body having a refractive index graded radially in a cross section normal to the central axis thereof, so as to decrease in proportion to the square of the distance from the rod axis.

Owing to this graded refractive index distribution, a light beam directed into and through the transmission body along the central, longitudinal axis thereof varies cyclically in diameter as it proceeds through the transmission body. On the other hand, any off-axis inlet light beam, which enters the transmission body at an off-axis point in a direction parallel to the central axis thereof, propagates through the transmission body as a whole taking an undulatory path of a fixed length of period or pitch, as usually referred to. For details of the behavior of light in light-focusing transmission bodies or so-called rod lenses, reference may be had to the article, "Micro-Optics Devices for Branching, Coupling, Multiplexing and Demultiplexing", K. Kobayashi et al, in the Technical Digest, pp. 367-370 of the 1977 International Conference on Integrated Optics and Fiber Communication.

Figure 1:
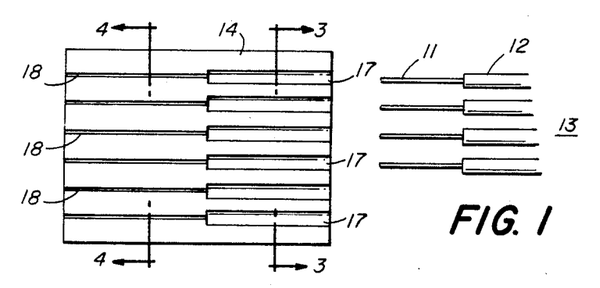
Figure 1A:
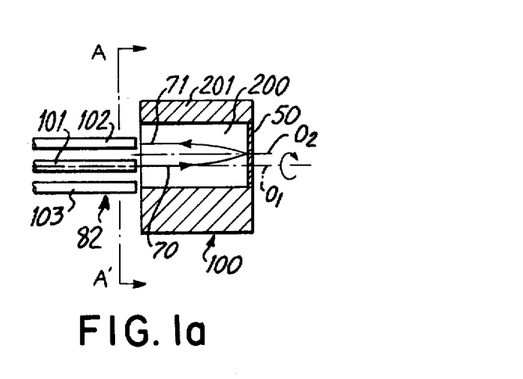
FIG. 1a is a longitudinal cross-sectional view of a first preferred embodiment of the present invention.
Figure 1B:
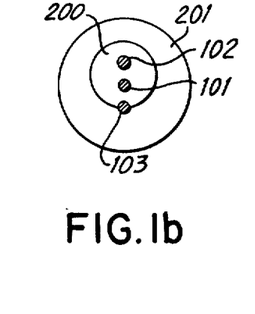

Referring now to FIGS. 1a and 1b, the light switch illustrated therein includes a cylindrical-shaped light-focusing transmission body or rod lens 200 of a quarter pitch length with its opposite end faces extending at right angles to the central, longitudinal axis $0_2$, on which axis the refractive index of the light transmission body is at its maximum. Provided on one of the opposite end faces of rod lens 200 is a total reflection film coating 50. Light-focusing transmission body 200 forms a light-path switching member 100 of the light switch together with an eccentrically hollowed cylindrical body or casing 201, in the hollow of which light transmission body 200 is firmly fitted with an eccentricity, $d_o$, relative to the axis $0_1$ of cylindrical casing 201, about the axis of which light-path switching member 100 is rotatable. Reference numeral 82 generally indicates a bundle of optical fibers arranged closely adjacent to the other end face of light transmission body 200 and including an optical fiber 101 arranged on axis of rotation, $0_1$, as an "incident-side" optical fiber and two optical fibers 102, 103 arranged symmetrically with respect to the axis of rotation, $0_1$, to serve as "switching-side" optical fibers. In the state illustrated, a light beam directed through optical fiber 101 into light transmission body 200 first takes a path 70 and then, being reflected by total reflection coating 50, procees along a path 71 to be focused into optical fiber 102. Similarly, after hollow cylindrical casing 201 has been rotated about its axis $0_1$ through an angle of 180°, the light beam emitted from optical fiber 101 into light transmission body 200 is reflected this time to enter optical fiber 103.

It will be readily understood from the foregoing, that in general, a 1-to-n multichannel light switch is obtainable with (n=2 or a larger positive integer) optical fibers arranged radially about axis of rotation, $0_1$, on a circle of radius d. Another optical fiber (101) being arranged on the axis of rotation and the angle of rotation required for the rotary portion 100 of the light switch is not necessarily limited to 180°, but may be varied in accordance with the angular spacing of the switching-side optical fibers, which is variable, or with the number of such fibers used.

Figure 2:
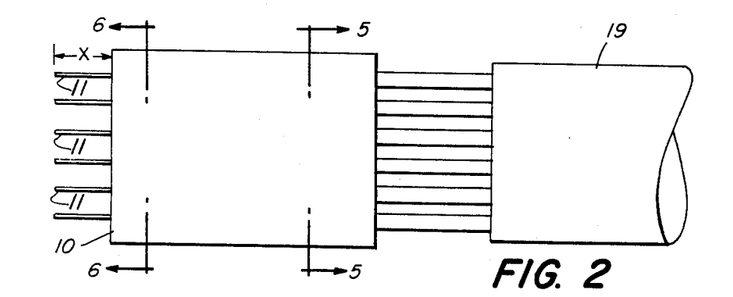
FIGS. 2a and 2b are view similar to FIG. 1a, showing a second preferred embodiment of the present invention in respective switching positions.
Figure 2A:
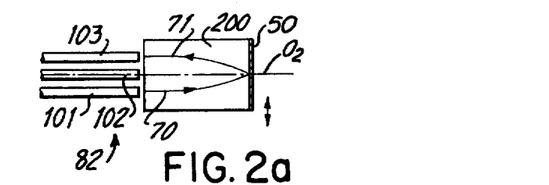
Figure 2B:
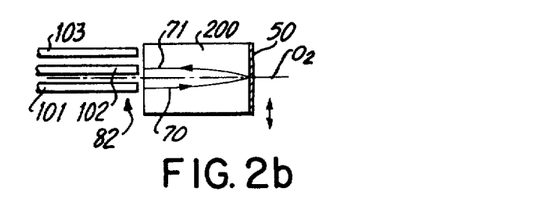

In another embodiment of the invention shown in FIGS. 2a and 2b, light-focusing transmission body 200 is not arranged so as to be rotatable as in the embodiment of FIGS. 1a and 1b, but rather is arranged so as to be displaceable in a direction substantially normal to its central axis $0_2$ for the light-path switching operation. Thus, in this embodiment, the coupling to optical fiber 103 of the light emerging from incident-side optical fiber 101 is altered into a coupling to optical fiber 102 by the displacement of transmission body 200 from the position in FIG. 2a to that shown in FIG. 2b.

To generalize, a 1-to-n light switch is obtainable by arranging (n+1) optical fibers on one side of light-focusing transmission body 200 in a plane including the central axis $0_2$ of the latter, in which plane transmission body 200 is displaceable. Incidentally, it will be readily apparent that, though in FIGS. 2a and 2b optical fibers 102 and 103 are shown equally spaced from optical fiber 101, they may be unequally spaced therefrom, if desired.

Figure 3:
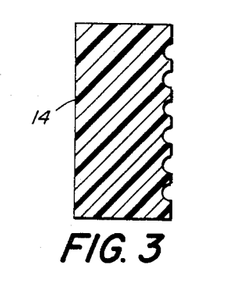
FIGS. 3a and 3b are transverse cross-sectional views of a third embodiment of the present invention, showing the arrangement of the optical fibers relative to the light-focusing transmission body or rod lens in two different switching positions.
Figure 3A:
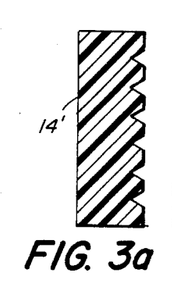
Figure 3B:
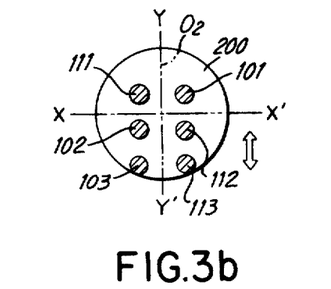

A further embodiment of the present invention is illustrated in FIGS. 3a and 3b, in which X-X' and Y-Y' represent the axes of a coordinate system with its origin laid on the axis of light-focusing transmission body 200. As shown in FIG. 3a, an optical fiber 112 is arranged on the coordinate axis X-X' and optical fibers 101 and 113 are arranged at the same distance from the optical fiber 112 on a straight line that extends through the optical fiber in parallel to the coordinate axis Y-Y'. Further optical fibers 102, 111 and 103 are arranged in symmetry with optical fibers 112, 101 and 113 with respect to the coordinate axis Y-Y'. In this state, the light emerging from optical fiber 101 and entering light-focusing transmission body 200 at one end proceeds over its length of a quarter pitch of light undulation to be reflected by a total reflection coating (not shown) at the other end of the transmission body and coupled to optical fiber 103. Similarly, light beam from optical fiber 111 is coupled to optical fiber 113. In the state of FIG. 3b, in which light-focusing transmission body 200 is shown translated in the direction of the coordinate axis Y-Y' by a distance equal to half the vertical distance of optical fibers 101 and 112 so that the coordinate axis X-X' lies between optical fibers 112 and 101 at equal distances therefrom. In this state, it will readily be noted that the light from optical fiber 101 is coupled to optical fiber 102 and that from optical fiber 111 to optical fiber 112. It will therefore be appreciated, that, with this embodiment, two independent light beams coupled to a pair of optical fibers can be simultaneously switched so as to be coupled to another pair of optical fibers.

To generalize, a light switch for use in switching between n-circuit light paths can be obtained, according to the embodiment described above, with a single light-focusing transmission body by arranging adjacent to one end face thereof three rows each of n optical fibers in parallel to straight line X-X', including one row of n incident-side optical fibers and two rows of n switching-side optical fibers. Further, it is to be noted that a light switch of the same basic form capable of n-circuit m-channel light-path switching can be obtained by employing m(=2 or a larger positive integer) switching-side optical fibers in each row of optical fibers parallel to straight line Y-Y'.

Incidentally, though, in FIGS. 3a and 3b, incident-side optical fiber 101 and switching-side optical fibers 112 and 113 in one vertical row and those 111, 102 and 103 in the other vertical row are both shown equally spaced from each other, it is to be understood that such spacing is not necessarily required.

According to the embodiments described above, since the light directed into light-focusing transmission body 200 travels forward and backward therethrough, taking a period substantially equal to one half of the pitch of light undulation, the light beam emerging from the transmission body has a size or diameter substantially the same as that when entering the transmission body. This holds true particularly in cases where incident-side optical fibers 101, 111, ... are of the same fiber parameters, such as core diameter, numerical aperture and etc., as switching-side fibers 102, 112, 103, 113, ... . Further, light-focusing transmission body 200 may, as desired, perform the function of matching the size of the light beam in addition to the light-path switching function example, by giving it an appropriate length shorter than one-quarter the pitch of the light undulation in the transmission body. Obviously this enables realization of a light switch which is extremely low in insertion loss.

Figure 4:
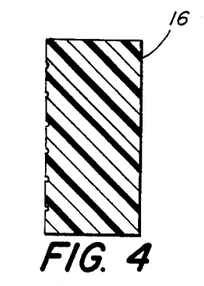
Figure 4A:
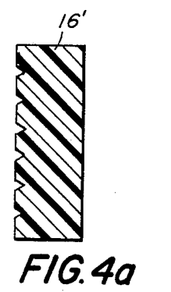
FIG. 4a is an oblique view, partially cutaway, of a fourth embodiment of the present invention.
Figure 4B:
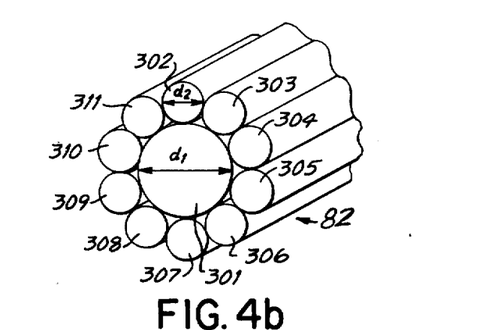

FIG. 4a illustrates a more specific form of a light switch shown schematically in FIGS. 1a and 1b. As seen in these figures, light-path switching member 100 includes a commercially available light-focusing transmission body 200 having a diameter of 2 mm., a length of approximately 5 mm. and NA=0.5, which is securely fitted in a hollow cylinder 201 with an eccentricity $d_0$. Switching member 100 is fixedly mounted on the output shaft of a small-sized stepping motor 83 in axial alignment therewith. An optical fiber bundle 82 is arranged adjacent to one end face of transmission body 200, the opposite end face of which carries a total reflection coating 50. The stepping motor 83 and optical fiber bundle 82 are both fixed to an outer casing 84. As shown in detail in FIG. 4b, optical fiber bundle 82 consists of a first, central optical fiber 301 having an outside diameter $d_1$ and ten optical fibers 302-311, of outside diameter $d_2$, radially arranged about first optical fiber 301. The outside diameter $d_1$ and $d_2$ are determined in the following relationship:

$$d_1 = d_2 (1 - \sin \frac{\pi}{p})/\sin \frac{\pi}{p} \qquad (1)$$

where p represents the number of optical fibers arranged about the first optical fiber and, in this illustration, p=10.

In this manner, optical fibers 302-311 are accurately arranged in contact with each other and with central optical fiber 301 about the axis of the latter on a circle of a radius, $\frac{1}{2}(d_1+d_2)$. The axis of central optical fiber 301 in the bundle 82 is aligned with the axis of rotation of the stepping motor and is eccentric with respect to the axis of the light-focusing transmission body by an amount $d_0=\frac{1}{2}(d_1+d_2)$.

Figure 4C:
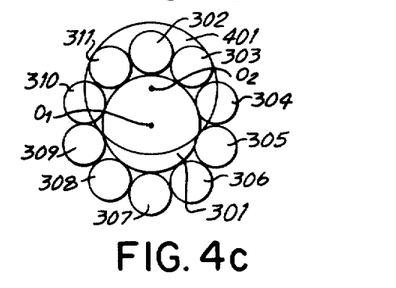
FIGS. 4c and 4d are cross-sectional views showing the embodiment of FIG. 4a in two respective switching positions.
Figure 4D:
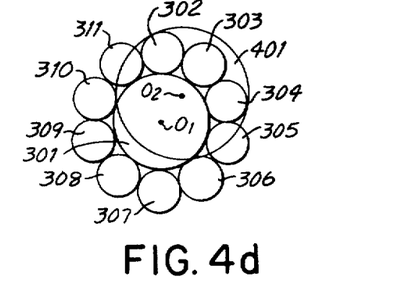

Referring to FIGS. 4a and 4c, the light beam directed through central optical fiber 301 into light-focusing transmission body 200 is reflected by total reflection coating 50 on the remote end face thereof so as to be coupled to one of the circumferentially arranged optical fibers, 302, which lie in symmetrical relation to central optical fiber 301 with respect to the axis $0_2$ of light-focusing transmission body 200. In FIG. 4d, transmission body 200 is shown rotated about the axis of rotation $0_1$ through an angle of approximately 36° so that the light beam from the central optical fiber 301 is coupled to optical fiber 303. Similarly, the light from the optical fiber 301 can be coupled successively to optical fibers 304-311 upon incremental rotation of light-focusing transmission body 200.

Figure 5A:
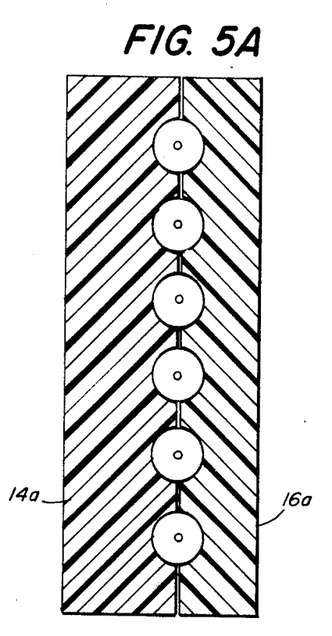
FIG. 5a is an oblique view of another form of an optical fiber bundle usable in the present invention.
Figures 5A, 5B, 5C:
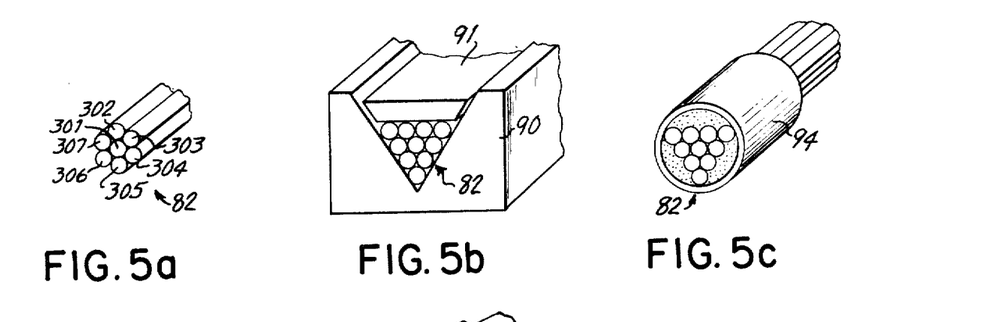
Figure 5B:
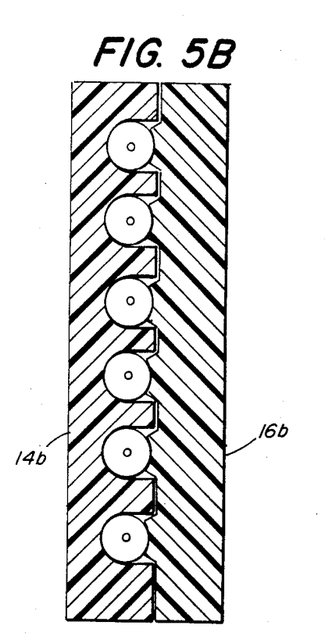
Figure 5C:
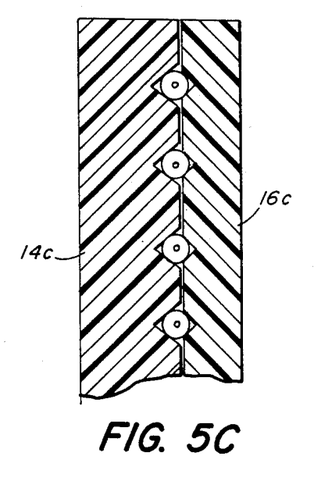
Figure 5D:
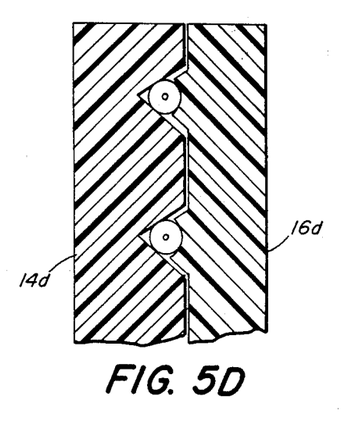

FIG. 5a illustrates another form of optical fiber bundle 82, which is a particular case of the one shown in FIG. 4b and includes a multimode optical fiber 301 having a core diameter of 100 μm and NA=0.22 and six optical fibers 302-307, of the same outside diameter and character as optical fiber 301, closely arranged about fiber 301. As will be apparent, this fiber arrangement represents the case where p=6 in the formula (1). Fiber bundles of this structure can be conveniently fabricated in the following manner: As illustrated in FIG. 5b, ten optical fibers of the same outside diameter are loaded successively in the groove of a 60° V-bock 90. The optical fibers are then pressed down by means of a push plate 91 so as to be held in close contact with each other at their peripheral surfaces. In this state, an appropriate adhesive agent is applied to set the optical fibers in place. It will be understood that, in the fiber bundle thus formed which is generally triangular in cross section, the optical fibers arranged at the three apexes are intended only to serve in the bundling process. The fiber bundle 82 fabricated in the manner described is embedded in a metal pipe 94, as shown in FIG. 5c.

Figure 6:
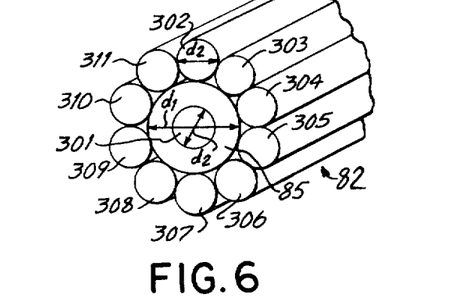
FIGS. 6 and 7 illustrate further forms of optical fiber bundles usable in the present invention.
Figure 6A:
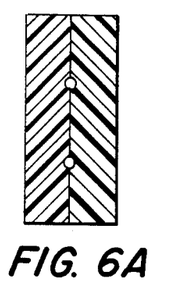
Figure 6B:
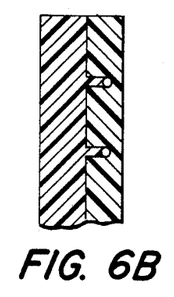

FIG. 6 illustrates another form of the optical fiber bundle which includes a central optical fiber of outside diameter $d_2$ and circumferential optical fibers 302-311 of the same diameter $d_2$. Central optical fiber 301 is securely fitted in a hollow cylinder 85 of inside diameter $d_2$ and outside diameter $d_1$. The diameters $d_1$ and $d_2$ are related so as to satisfy the formula (1) and outer optical fibers 302-311 are arranged in contact with each other and with the outer peripheral surface of cylinder 85. It will be appreciated that this fiber bundle structure not only makes it possible to, have a relatively large number of light transmission channels utilizing optical fibers all of the same kind, but also to mechanically arrange such optical fibers with high accuracy.

Figure 7:
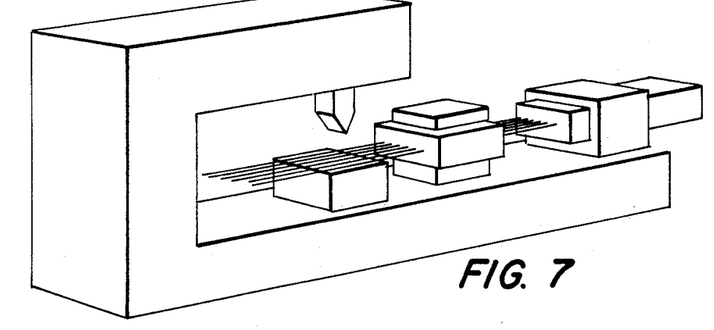

Reference will next be had to FIG. 7, which illustrates a further form of optical fiber bundle, including seven optical fibers 301-307 fixedly inserted in respective holes formed in a cylindrical-shaped fiber holder. As observed, one of the holes extends through the fiber holder along the axis thereof to receive the central optical fiber 301 while the remaining holes, each extending through the fiber holder, are arranged circumferencially about the holder axis at an angular spacing of 60° to receive optical fibers 302-307. The fiber bundle 82 of this structure is advantageous in that its optical fibers can be accurately positioned relative to each other with ease, by their insertion into the respective through holes formed in the fiber holder and that their terminals are effectively protected against mechanical or other external influences.

Figure 8:
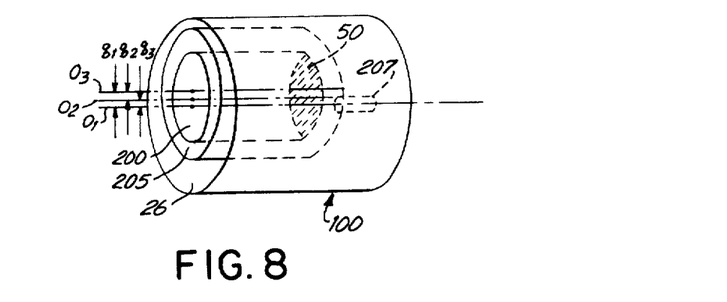
FIG. 8 is an oblique view showing the double eccentric form of a light-path switching structure usable in a further embodiment of the present invention.
Figure 8A:
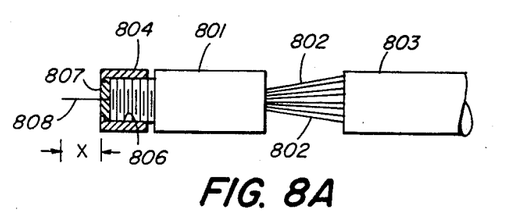
Figure 8B:
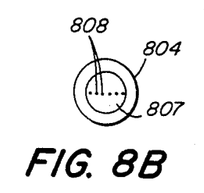

FIG. 8 illustrates a double eccentric structure of light-path switching member 100 with a light-focusing transmission body 200 incorporated therein, which has a quarter pitch length and a total reflection coating 50 formed on one end face thereof. As shown, transmission body 200 is fitted in a first hollow cylinder 205, with its axis $0_2$ radially offset a distance $q_2$ from the axis $0_3$ of first hollow cylinder 205, which is held in a second hollow cylinder 206 with its axis $0_3$ offset a distance $q_1$ from the axis $0_1$ of the latter. Reference numeral 207 indicates an axial hole formed in second hollow cylinder 206 to receive the output shaft of a stepping motor, not shown. Such a double eccentric structure makes it possible to vary the distance between the axis of light-focusing transmission body 200 and that of second hollow cylinder 206, or the axis of rotation of the assembly freely within a definite range. This means that the light-focusing transmission body and the first hollow cylinder can be rotated relative to the fixed optical fiber bundle and fixed in any desired positional relationship with an amount of eccentricity so as to provide optinum coupling efficiency.

Figure 9:
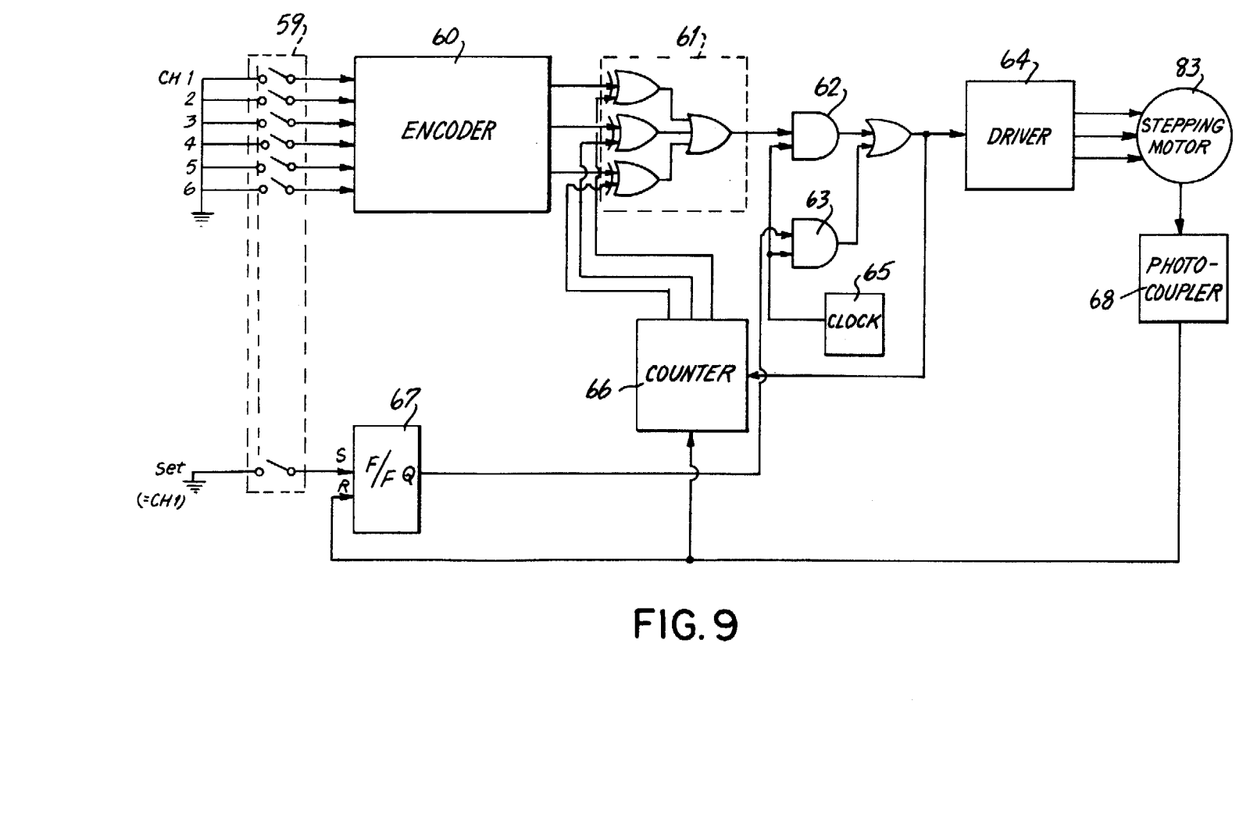
FIG. 9 is a block diagram of the drive circuit for a step motor usable in the present invention.
Figure 9A:
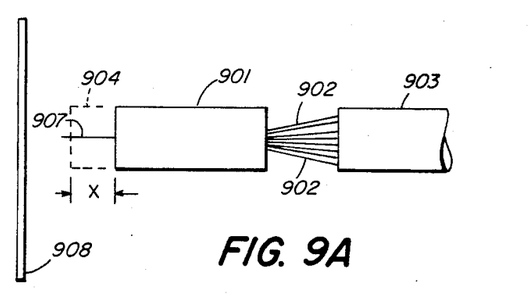
Figure 9B:
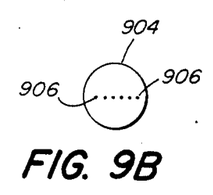

One practical example of light switch of the basic structure of FIG. 4a, which employs an optical fiber bundle shown in FIG. 5c and a three-pole 15-step stepping motor, is 24 mm in outside diameter and 44 mm in length. In this example, the light entering the light-focusing beam transmission body from the central optical fiber 301 can be switched onto any desired one of the circumferencial optical fibers 302–307 by depressing an appropriate one of the channel buttons in the circuitry shown in the block diagram of FIG. 9. Specifically, in FIG. 9, upon depression of the set button of a septuple-gang pushbutton switch 59 which is operatively associated with the channel button 1, a binary parallel signal corresponding to channel 1 is produced from an encoder 60 while at the same time the output of an S-R flip-flop 67 rises to its high level so that pulses from a clock 65 are fed through an AND gate 62 to a driver 64, which rotates the stepping motor 83. When a slit secured to the output shaft of stepping motor 83 comes into alignment with the optical axis of one of the circumferential optical fibers, say, fiber 302, the S-R flip-flop 67 and a counter 66 are reset by a signal from a focally arranged photocoupler 68. As a consequence, the output of flip-flop 67 is set at its high level and a binary code output corresponding to channel 1 appears at the binary parallel terminal of counter 66. In this state, light from the optical fiber 301 is coupled to the optical fiber 302. Upon depression of channel button 4, a binary parallel signal corresponding to channel 4 is outputed from encoder 60 and compared at a comparator 61 with the signal set in counter 66. As long as the two signals are out of code coincidence, clock pulses are sent through AND gate 62 to the driver 69 and hence stepping motor 83 is rotated. At the same time, the clock pulses are also fed to counter 66, which is advanced a step each time four pulses have been counted, when the outputs of encoder 60 and counter 66 have become equal to each other, stepping motor 83 comes to a stop and the light from optical fiber 301 is switched over to circumferential optical fiber 305.

It has been found that with light switches of the structure described above the insertion loss for each channel can be held at 1.0 dB or below, including the reflection losses at the end faces of the associated light-focusing transmission body and that the variation of the insertion loss between channels are held in a limited range of ±0.07 dB or under. Variation of the insertion loss when the channel switching is repeated $10^3$ times has been found to be highly reproducible, and limited to ±0.1 dB or under for each channel. Further, the amount of leakage to the other channels is of a low enough value of −35 dB or under, for each channel.

Figure 10:
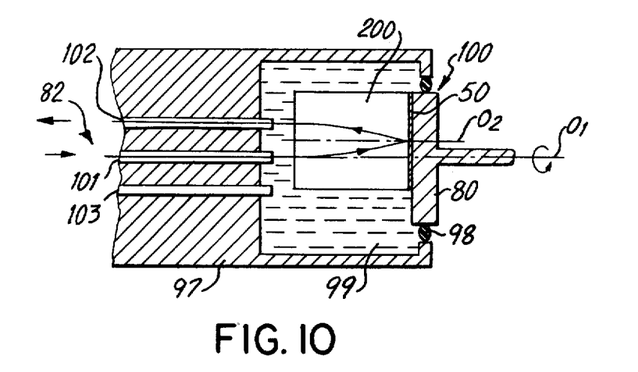
FIGS. 10, 11, and 12 illustrate further preferred embodiments of the present invention.
Figure 10A:
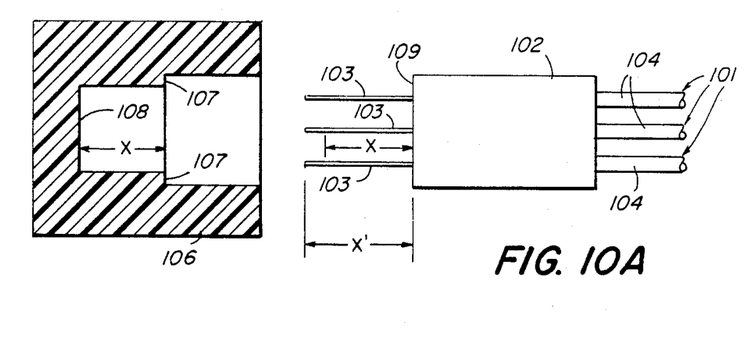
Figure 10B:
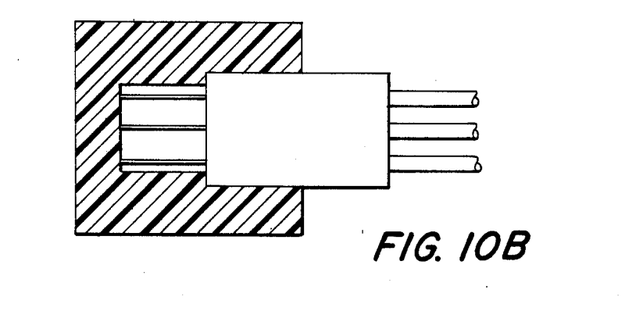

FIG. 10 illustrates a further embodiment of the present invention, in which an optical fiber bundle 82 and a light-path switching member 100 are accommodated in a common case 97 and a refractive-index matching liquid 99 is disposed between the fiber terminals and light-focusing transmission body 200 and sealed against leakage by means of an O-ring 98. No detailed description will be required of the spatial arrangement of fiber bundle 82 and the light-path switching member 100, since it is the same as that described in connection with FIG. 1b, except that light-focusing transmission body 200 in this embodiment is secured to a rotary disc 80. With optical fiber cores of a refractive index of 1.51 and the light-focusing transmission body of a refractive index of 1.61, the reflection loss has been found negligible, being of the order of 0.05%, the matching liquid used having a refractive index of 1.56.

Figure 11:
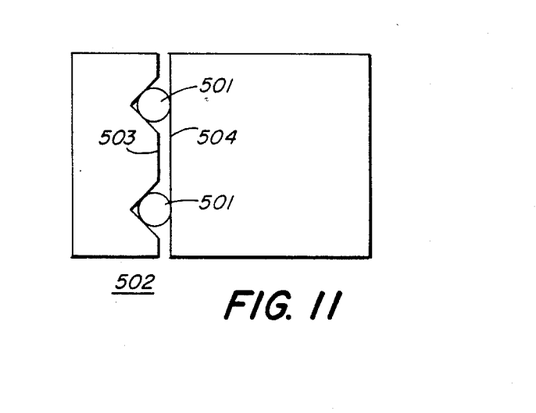

Another embodiment of the present invention, shown in FIG. 11, includes an optical fiber bundle 82 spatially arranged in the same manner as described in connection with FIGS. 1a and 1b. A glass plate 52 having a refractive index equal to that of the fiber cores is adhesively secured to the forward end of the optical fiber bundle 82. Applied to the opposite surface of the glass plate 52 is an anti-reflection coating 53. The light-focusing transmission body 200, carrying a total reflection coating 50 on one of the opposite end faces thereof has an anti-reflection coating 51 applied to the other end face of the transmission body, which is adjacent to the optical fiber bundle. With anti-reflection coatings 51 and 52, the reflection loss at the terminal of each of the optical fibers and the opposing end face of the light-focusing transmission body is effectively reduced. Where the glass plate 52 is of a material having a refractive index different from that of the optical fiber cores, an anti-reflection coating should also be applied to the surface of the glass plate which comes in contact with the optical fibers. Use of the coating on the forward end of the optical fiber bundle of the glass plate, is opposed to an anti-reflection coating on each of the individual optical fibers, thus substantially simplifying the fabrication of the optical fiber assembly.

Figure 12:
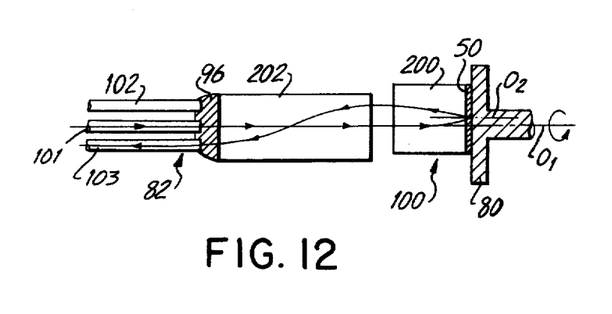

FIG. 12 illustrates yet another embodiment of the present invention, which includes an optical fiber bundle 82 and a light-path switching member 100 spatially arranged in the same manner as described previously in connection with FIGS. 1a and 1b. As illustrated, a second light-focusing transmission body 202, which is of a one-half pitch length, is arranged in axial alignment with the axis of rotation, $0_1$, of the light-path switching member 100. The optical fibers, with their forward end faces left optically unpolished are secured to the adjacent end face of second light-focusing transmission body 202 by means of an adhesive agent 96 which has a refractive index of a value intermediate those of the respective materials of the optical fibers and transmission body 202. Clearly, light coming through optical fiber 101 enters the second light-focusing transmission body 202 through the refractive-index matching layer of adhesive agent 96 and first light-focusing transmission body 200. On this occasion, it will be noted that the light emerging from the optical fiber can enter second light-focusing transmission body 202 only with a reduced attendent loss because of refractive-index matching layer 96, which fills the space between the forward end of the optical fiber 101 and second light-focusing transmission body 202 arranged adjacent thereto. The light having entered first light-focusing transmission body 200 is reflected by total reflection coating 50 and, leaving transmission body 200, proceeds through second light-focusing transmission body 202 and refractive-index matching layer 96, this time in the opposite direction, to enter another optical fiber 103, again with a low loss under the effect of the refractive-index matching layer 96. In this connection, it is to be noted that the light from the optical fiber 101 enters optical fiber 103 in a beam form matched almost perfectly under the lens action of the first and second light-focusing transmission bodies 200 and 202. In this manner, the light emerging from the optical fiber 101 is coupled to the optical fiber 103 with high efficiency.

Similarly, upon rotation of the rotary disc 80 about the axis of rotation, $0_1$, through an angle of 180°, the light emerging from optical fiber 101 is switched to be coupled efficiently to a further optical fiber 102.

As apparent from the foregoing description, a light switch of a clear low loss characteristic is obtainable with second light-focusing transmission body 202 and refractive-index matching layer 96, which are secured to the forward end of optical fiber bundle 82, eliminating the need for mirror-polishing the respective end faces of optical fibers 101–103.

Further in the embodiment described above it will be apparent that anti-reflection coatings may be applied to the confronting end faces of the first and second light-focusing transmission bodies 200 and 202 to further reduce the insertion loss of the light switch.

Though in this embodiment the second light-focusing transmission body 202 employed has a length substantially equal to half the pitch of light undulation, it will be apparent that it may have a length substantially equal to any integral multiple of the half pitch of light undulation.

In any of the embodiments described herein, it will be apparent that the light-focusing transmission body with a total reflection coating applied to one end face thereof may be given a length equal to any odd multiple of one-half the pitch of light undulation at all times with the same satisfactory result.

It will be readily appreciated from the foregoing description that, according to the present invention, a light switch is provided which has various advantages including simple operation, compact size, low loss, low cost and high reliability, is highly valuable for use not only in the switching between a light transmitter or receiver and associated light transmission lines but also in different optical measuring systems, thus representing a notable contribution to the performance and economy of the associated devices.

What is claimed is:

1. A light switch comprising: a light-focusing transmission body, said transmission body having a central axis and having opposite end faces normal to the axis thereof and having a refractive index radially graded to decrease in proportion to the square of the distance from said axis and an axial length substantially equal to an odd multiple of one quarter of the pitch of light beam undulation in said transmission body; reflecting means provided on one of said end faces of said transmission body; a bundle of optical fibers arranged adjacent to the other end face of said transmission body in parallel relation to said axis thereof; and means for moving said transmission body relative to said bundle of optical fibers in a plane normal to the axis of said transmission body.

2. A light switch as set forth in claim 1, in which said means for moving the transmission body are rotating means, the axis of rotation of said rotary means is in spaced parallel relation to said axis of said transmission body.

3. A light switch as set forth in claim 2, wherein said rotating means include a rotary shaft and in which said transmission body is held by holder means fixed to said rotary shaft.

4. A light switch as set forth in claim 3, in which said holder means include a first hollow cylindrical member having a cylindrical hollow formed therein on an axis offset from the axis of said rotary shaft.

5. A light switch as set forth in claim 4, in which said holder means further include a second hollow cylindrical member having a cylindrical hollow formed therein on an axis offset from the axis of the cylindrical hollow in said first hollow cylindrical member.

6. A light switch as set forth in claim 3, in which said bundle of optical fibers includes a central optical fiber arranged in aligned relation to the axis of said rotary shaft and a plurality of optical fibers arranged circumferentially about the axis of said rotary shaft on a common circle centered thereon.

7. A light switch as set forth in claim 6, in which said circumferentially arranged optical fibers are held in contact with each other and with said central optical fiber.

8. A light switch as set forth in claim 6, in which said central optical fiber is arranged in the center of a hollow cylindrical member and said circumferentially arranged optical fibers are held in contact with each other and with the outer peripheral surface of the hollow cylindrical member.

9. A light switch as set forth in claim 6, in which the axis of said light-focusing transmission body is offset from the axis of said rotary shaft by a distance equal to half the distance of said circumferentially arranged optical fibers from said central optical fiber.

* * * * *

UNITED STATES PATENT AND TRADEMARK OFFICE
CERTIFICATE OF CORRECTION

PATENT NO. : 4,265,513

DATED : May 5, 1981

INVENTOR(S) : Shiego Matsushita et al.

It is certified that error appears in the above—identified patent and that said Letters Patent is hereby corrected as shown below:

Cancel the Front Page and the four (4) sheets of drawings and substitute therefor, the attached Front Page and five (5) sheets of drawings.

Signed and Sealed this

Twenty-third Day of February 1982

[SEAL]

Attest:

GERALD J. MOSSINGHOFF

Attesting Officer

Commissioner of Patents and Trademarks

United States Patent [19]

Matsushita et al.

[11] 4,265,513
[45] May 5, 1981

[54] LIGHT SWITCH

[75] Inventors: Shigeo Matsushita; Ro Ishikawa; Kazuhisa Kaede; Ikuo Mito; Shigetoki Sugimoto, all of Tokyo, Japan

[73] Assignee: Nippon Electric Co., Ltd., Tokyo, Japan

[21] Appl. No.: 67,013

[22] Filed: Aug. 16, 1979

[30] Foreign Application Priority Data

| Aug. 17, 1978 | [JP] | Japan | 53-113005[U] |
| Aug. 30, 1978 | [JP] | Japan | 53-106551 |
| Aug. 30, 1978 | [JP] | Japan | 53-119340[U] |
| Sep. 14, 1978 | [JP] | Japan | 53-127348[U] |
| Sep. 14, 1978 | [JP] | Japan | 53-127349[U] |
| Sep. 18, 1978 | [JP] | Japan | 53-128537[U] |

[51] Int. Cl.³ ............................................. G02B 5/14
[52] U.S. Cl. ............................... 350/96.20; 350/96.16; 350/96.18
[58] Field of Search ................. 350/96.16, 96.18, 96.20

[56] References Cited

U.S. PATENT DOCUMENTS

| 4,111,524 | 9/1978 | Tomlinson | 350/96.16 |
| 4,208,094 | 6/1980 | Tomlinson et al. | 350/96.16 |

OTHER PUBLICATIONS

K. Kobayashi et al., "Micro-Optics Devices for Branching, Coupling, Multiplexing & Demultiplexing", *International Conf. on Integrated Optics* . . . , Jul. 1977, Tokyo, Japan.
K. Suzuki et al., "Optical Fiber Line Switch", *Proceedings National Convention of IE & CE of Japan*, vol. 4, pp. 4-113, Mar. 1978.
Mito et al., "Motor-driven Rotary Mirror Type Multichannel Line Switch" in *Proceedings National Conv. of E & C.E. of Japan*, vol. 4, pp. 4-117, Mar. 1978.
Tomlinson et al., "Multiposition Optical Fibre Switch" in *Electronics Letts.*, vol. 15, No. 6., Mar. 1979.
M. Nunoshita et al., "Optical Switch for Multimode Optical-Fiber Systems" in *Optics Letts.*, vol. 4, No. 1, Jan. 1979.
A. Ishikawa et al., "Beam Splitting & Coupling Circuits Using a Selfoc Lens" at *Meeting Institute of Japan Electronic Comm. Eng.*, Mar. 1977.

*Primary Examiner*—Stewart J. Levy
*Attorney, Agent, or Firm*—Hopgood, Calimafde, Kalil, Blaustein & Lieberman

[57] ABSTRACT

A multichannel light switch including a cylindrical-shaped light-focusing transmission body having a length equal to an odd multiple of one quarter of the pitch of light beam undulation within the body and having a total reflection coating applied to one end face thereof, which is normal to the axis of the transmission body. A stationary optical fiber bundle is arranged opposite to the other end face of the transmission body and is in parallel to the axis thereof. For light-path switching between the optical fibers, the transmission body is adapted to be displaced in a radial direction or to be rotated in a plane normal to the axis thereof.

9 Claims, 20 Drawing Figures